United States Patent [19]

Guimbretiere

[11] Patent Number: 5,457,992
[45] Date of Patent: Oct. 17, 1995

[54] METHOD FOR TAKING UP CLEARANCE AND PROVIDING A DYNAMIC BALANCING OF A TRANSMISSION DEVICE, AND DEVICE INCLUDING ITS APPLICATION

[75] Inventor: Pierre Guimbretiere, Neauphle-Le-Chateau, France

[73] Assignee: GKN Glaenzer Spicer, Poissy, France

[21] Appl. No.: 164,923

[22] Filed: Dec. 2, 1993

[30] Foreign Application Priority Data

Dec. 3, 1992 [FR] France .................................. 92 14576

[51] Int. Cl.$^6$ .................................................. G01M 1/16
[52] U.S. Cl. .................... 73/468; 73/460; 73/66
[58] Field of Search ........................... 73/457, 460, 468, 73/469, 470, 66

[56] References Cited

U.S. PATENT DOCUMENTS

| | | |
|---|---|---|
| 2,804,775 | 9/1957 | Hack . |
| 3,152,482 | 10/1964 | Federn ..................................... 73/460 |
| 4,724,708 | 2/1988 | Okano et al. . |
| 4,974,449 | 12/1990 | Core . |
| 5,267,140 | 11/1993 | Ibe .......................................... 73/468 |

FOREIGN PATENT DOCUMENTS

| | | |
|---|---|---|
| 2527718 | 5/1982 | France . |
| 2544254 | 4/1977 | Germany . |
| 3732099 | 4/1989 | Germany . |
| 4316717 | 3/1993 | Japan . |

OTHER PUBLICATIONS

Transactions of the American Society of Mechanical Engineers, Series B: Journal of Engineering for Industry, vol. 97, No. 2, May 1975, New York, pp. 708–712, M. M. Durum "Kinematic Properties of Tripode (Trip–pot) Joints".

Primary Examiner—Hezron E. Williams
Assistant Examiner—Max H. Noori
Attorney, Agent, or Firm—Harness, Dickey & Pierce

[57] ABSTRACT

The invention relates to transmission devices comprising at least one joint and/or at least one sliding connection and more particularly concerns taking up clearances and providing a dynamic balancing of such devices. The invention comprises mainly intentionally sufficiently unbalancing an inner or "floating" part of the device to exceed the random imbalance resulting from radial clearances existing in the joints (20) or sliding connections. The subsequent balancing of the whole of the transmission device is in this way rendered really effective.

12 Claims, 2 Drawing Sheets

METHOD FOR TAKING UP CLEARANCE AND PROVIDING A DYNAMIC BALANCING OF A TRANSMISSION DEVICE, AND DEVICE INCLUDING ITS APPLICATION

The present invention relates to transmission devices comprising at least one joint and/or at least one sliding connection and more particularly relates to taking up clearances and providing a dynamic balancing of said devices.

These devices may be defined as comprising at least one outer part centred relative to a structural element, and at least one inner part connected to the outer part by at least one joint and/or at least one sliding connection. If there is provided only a single joint or a single connection, the latter comprises two elements respectively connected to the adjacent outer and inner parts of the device. If there are provided two joints interconnected by an intermediate transmission shaft, the inner part of the device comprises the intermediate shaft and the elements of the joints to which it is connected.

Moreover, a sliding connection may be associated with the joint or with at least one of the joints.

The joints may be constituted by universal joints, joints of the tripod type, ball joints or by any other known joint.

Whatever be their structure, it is usually necessary to proceed to a dynamic balancing of such transmission devices owing to the rotational speeds encountered in use. A dynamic balancing amounts to attempting to make the physical axis of rotation imposed by the centrings of the outer parts of the device coincide with the principal longitudinal axis of inertia of the assembly, which is determined by the masses involved and their relative positions. Such a balancing may be fairly easily effected in the case of a single, solid or tubular shaft but it is practically impossible to achieve with transmission devices such as those defined hereinbefore which comprise at least one joint and/or a sliding connection. Indeed, such a joint has radial clearances due to the production tolerances of the different component parts making up the device, and to the necessity of ensuring that these different parts are capable of moving relative to one another without restraint. The sliding connecting means, usually of the splined type, also have relatively large radial clearances.

This problem of a dynamic balancing has its origin in the fact that it is impossible to eliminate the residual imbalance equal to the product of the mass of the inner part of the transmission device multiplied by the value of the radial clearance existing in the joint or joints and/or connections. Further, the imbalance values found on inspection or during use do not coincide with the nominal value measured in the course of the balancing operation. This is due to the fact that upon each rotation, the radial clearance existing between the different component parts of the device is taken up in a direction which depends on the angular position of the transmission at the moment at which it is rotated.

Vibrations result which are more or less erratic and are of course detrimental to the comfort of the user.

An object of the present invention is to provide a method which solves this dynamic balancing problem and to produce a transmission device which can be balanced more effectively than in the prior art analyzed hereinbefore.

The invention therefore provides a method for taking up clearance in a rotary transmission device, comprising at least one outer part which is centred in use relative to a structural element and has a well-defined axis, and at least one inner part connected to the outer part by at least one joint and/or at least one sliding connection having a radial clearance, the or each inner part having a freedom of radial movement resulting from said radial clearance, characterized in that it comprises unbalancing at least one element belonging to an inner part of the device, this imbalance being greater than that which may result, upon rotation of the device, from the clearance existing in the or each joint and/or connection.

The invention also provides a method for balancing a rotary transmission device comprising at least one outer part which is centred in use relative to a structural element and has a well-defined axis, and at least One inner part connected to the outer part by at least one joint and/or at least one sliding connection having a radial clearance, the or each inner part having a freedom of radial movement resulting from said radial clearance, characterized in that it comprises unbalancing at least one element belonging to the inner part, this imbalance being greater than that which may result, upon rotation of the device, from the clearance existing in the or each joint and/or sliding connection, then balancing the whole of the device by acting, in the known manner, on at least one element belonging to an outer part which is centred relative to a structural element.

According to other features of the invention:

the aforementioned imbalance is achieved by rendering at least one part of the element belonging to the inner part eccentric, or by adding or withdrawing material in at least one eccentric region of said element;

if m represents the mass of the eccentric part, e the distance of eccentricity from the axis of rotation of the unbalanced element, M the mass of the inner part to which the unbalanced element belongs, and j the radial clearance inherent in the joint and/or the sliding connection, the following relation: $m \times e > M \times j$ is respected;

the unbalanced element is close to the joint and/or the connection having a radial clearance.

The invention also provides a transmission device comprising the application of either one of the methods defined hereinbefore.

The invention will be described hereinafter in more detail with reference to the accompanying drawings which are given solely by way of example and in which.

Figure 1:
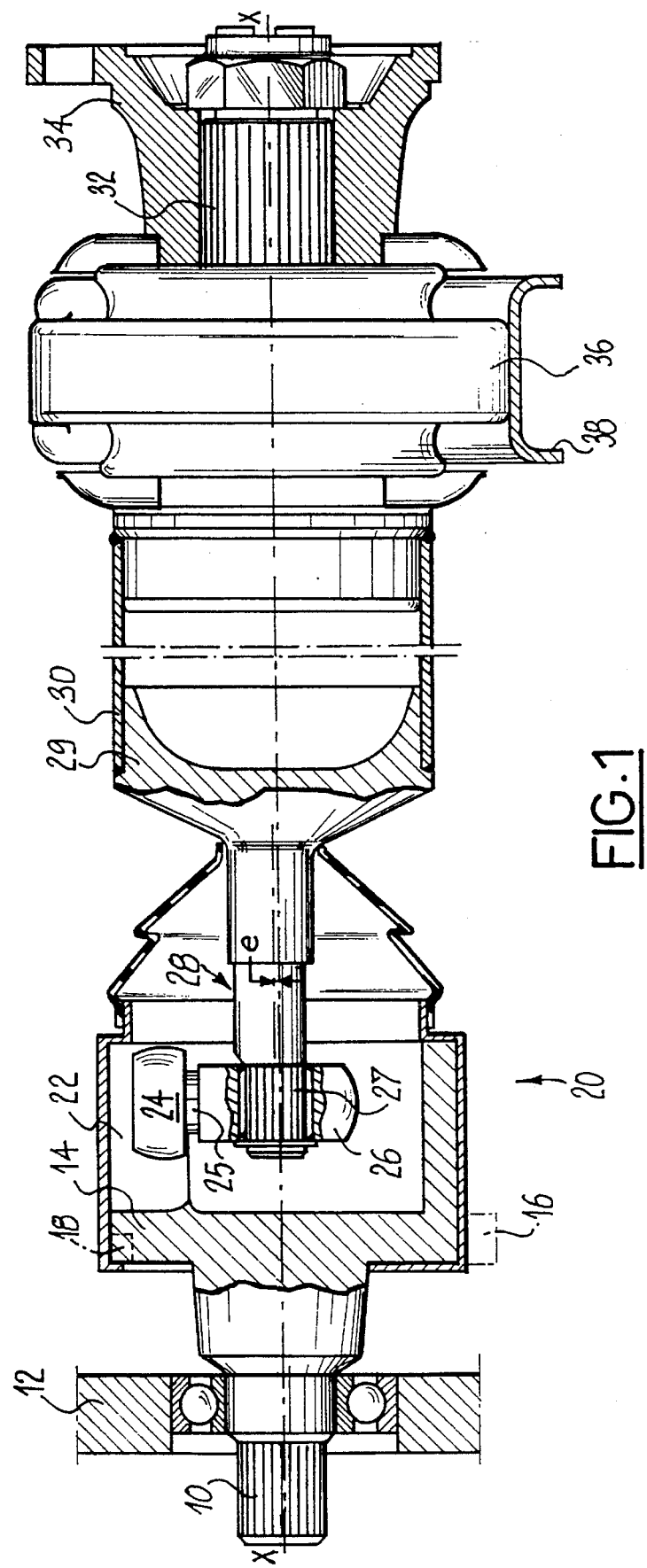
FIG. 1 is a partly elevational and partly longitudinal sectional view of a transmission in which the method according to the invention is employed.

Shown in FIG. 1 is a transmission device comprising a driving element 10 having an axis X—X assembled to be centred relative to a structural element or support 12. This driving element is fixed to a tulip member 14 which is part of a joint 20 of the tripod type. This tulip member defines in the conventional manner three pairs of raceways 22 with which cooperate three spherical rollers 24 mounted on three trunnions 25 spaced 120° apart. The block 26 defining the trunnions is carried on one splined end portion 27 of a terminal member 28 whose other end portion 29 is of larger diameter and welded to a hollow shaft 30.

The splines 27 and the hollow shaft 30 are centred on the same axis X—X as the tulip member of the homokinetic joint, in the aligned position of the transmission.

This assembly is completed by a gaiter 31 in the known manner.

At its opposite end, the hollow shaft 30 carries a splined terminal member 32 fixed to a flange 34 adapted to be connected to a receiving element and it is centred by a rolling bearing 36 relative to a structural element 38.

According to the invention, the part of the terminal member 28 between the splined end and the region of the welding on the tubular shaft 30 is at least in part eccentric relative to the axis X—X by a value e.

If m designates the mass of the eccentric part and e designates the distance of eccentricity, M designates the mass of the assembly constituted by the tube 30, the terminal member 28 and the whole of the tripod block 24, 25, 26, 27, and j designates the radial clearance existing in the homokinetic joint, m and e must be so chosen that m×e>M×j.

Note that this radial clearance has a known maximum value j but its position is undetermined by construction.

M×j characterizes or measures the imbalance produced in the transmission by the existence of the clearance j in the joint. Owing to the systematic imbalance provided according to the invention, this clearance j, upon rotation of the transmission, is taken up for a relative position of the elements of the transmission which is always the same. Under these conditions, it is possible to achieve an overall balancing of the transmission device, for example by adding or withdrawing material on the joint tulip member (as shown at 16 and 18). When this dynamic balancing has been achieved it will be effective since, as mentioned before, upon the rotation of the transmission the element carrying the tripod will be offset within the limits of the clearance j, always in the same orientation and in the same relative position with respect to the tulip member. The balancing of the whole of the transmission can in this way be effective and the problem referred to in the preamble of this specification is solved.

Figure 2:
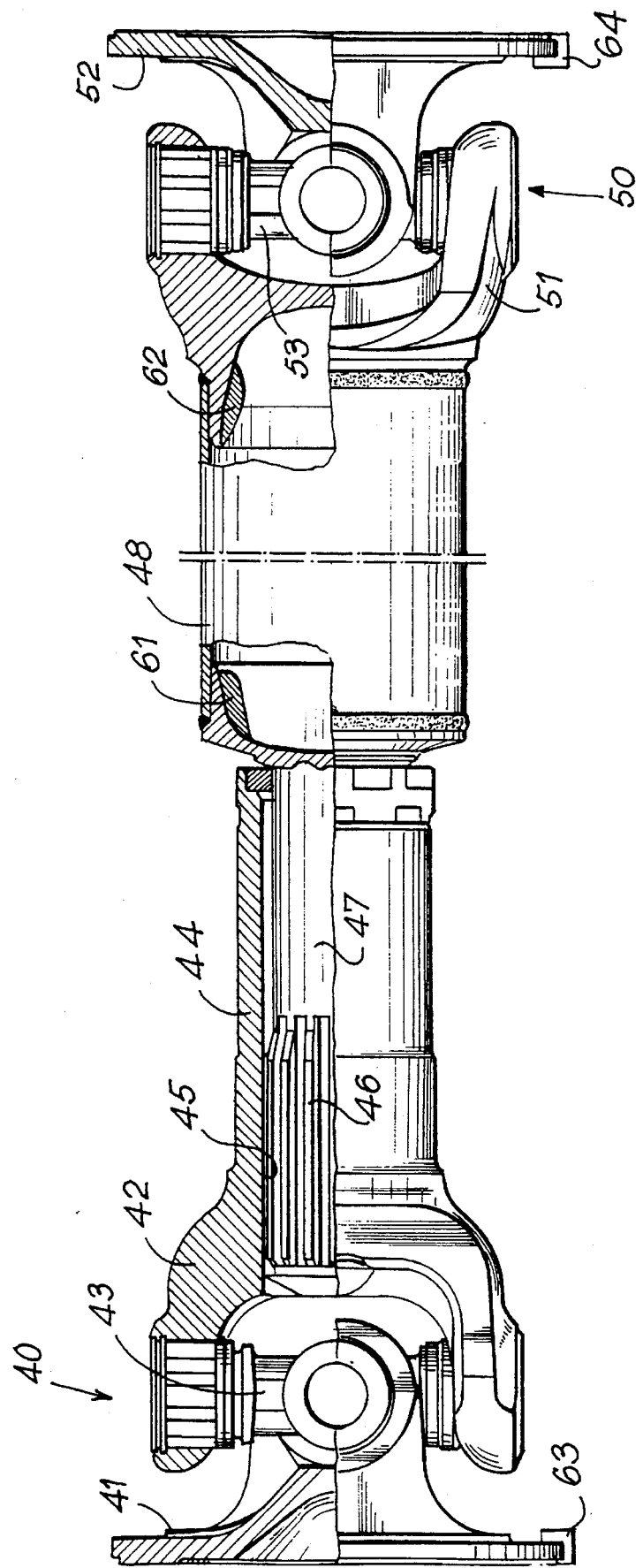
FIG. 2 is a partly elevational and partly sectional view of a second embodiment of the invention.

FIG. 2 shows another example of the application of the invention. It concerns a transmission comprising a first joint 40 constituted by a universal joint the first yoke 41 of which is adapted to be connected to a driving element (not shown).

The second yoke 42 of this joint, connected to the first yoke by a spider member 43, is fixed to a sleeve 44 provided with splines 45 cooperating with a series of splines 46 of a shaft section 47 which constitutes the terminal member of a hollow transmission shaft 48. The sleeve 44 and the terminal member 47 constitute a sliding connection allowing a variation in the length of the transmission.

The tubular shaft 48 is connected to the yoke 51 of a universal joint 50 constituting a second joint, the second yoke 52 of which is connected to the first yoke by a spider member 53 and is connected to a driven element (not shown).

The driving element and the driven element and the yokes 41, 52 are, when the transmission is mounted in the position of use, centred relative to structural elements so that their axes of rotation are perfectly defined.

By construction, radial clearances exist in the two joints constituted by the universal joints 40, 50 and in the sliding connection constituted by the splines 45, 46.

According to the invention, the terminal member 47 welded to the tubular transmission shaft comprises in the vicinity of its end welded to this shaft a weight 61 adapted to introduce a structural imbalance in a manner similar to that described in the first embodiment.

Likewise, the yoke 51 of the second joint has an eccentric weight 62.

In one embodiment, with reference to the left half of the assembly of the transmission from the middle of the tubular shaft 48, the mass of the sleeve 44 and the yoke 42 is on the order of 13 kg, the mass of the terminal member 47 and the adjacent tube section 48 is 10 g, the radial clearances in the universal joint and the sliding connection are respectively about 0.03 mm and 0.02 mm.

Under these conditions, the maximum imbalance possible resulting from these clearances is equal to 13,000×(0.03 mm)+10,000×(0.03+0.02 mm).

This maximum imbalance is therefore on the order of 1,000 g.mm. If the weight 61 is located at a distance E=40 mm from the axis of the element, its mass must be on the order of 30 g so as to respect the condition m×e>M×j.

A similar calculation is made for the weight 62.

As in the preceding example, this structural imbalance of the inner part of the transmission having been achieved, it is then sufficient to effect a balancing of the assembly in the known manner by adding or withdrawing a certain mass of material in suitable places (for example 63, 64) of the yokes 41, 52 of the universal joints, which are centred in use and constitute the outer part of the device.

In this text, "outer parts" of the device designate those constituted by elements which are centred relative to the structural elements and whose axes are well-defined, and "inner parts" designate those constituted by elements which, owing to the interposition of at least one joint or a sliding connection, have a certain freedom of radial movement or radially float resulting from the radial clearances existing in the or each joint and/or connection.

The separation between the "outer part" and the "inner part" is achieved in the region of the joint or connection which is the closest to the centred element, a part of the joint or connection being integrated with the outer part of the device, while the other part is integrated with the inner part of this device. The latter may moreover have a plurality of outer parts and a plurality of inner parts, in accordance with the number and the arrangement of the centrings and the joints and/or sliding connections.

This invention may be employed in any rotary assembly comprising a joint or a connection device having a certain radial clearance, by adapting to each particular case the aforementioned general principles.

It is in particular applicable in lateral and longitudinal transmissions of vehicles or transmissions employed in various industrial fields.

I claim:

1. Method for taking up clearance in a rotary transmission device comprising at least one outer part which is for centering, in use, relative to a structural support and has a well-defined axis, at least one inner part, and at least one joint or at least one sliding connection having a radial clearance, connecting said one inner part to said one outer part, said one inner part having a freedom of radial movement resulting from said radial clearance; said method comprising unbalancing at least one element belonging to said one inner part of said device, the imbalance created being greater than the imbalance which results, upon rotation of said device, from clearance existing in said one joint or said one connection.

2. Method for balancing a rotary transmission device comprising at least one outer part which is for centering, in use, relative to a structural support, and has a well-defined axis, at least one inner part, and at least one joint or at least one sliding connection having a radial clearance, connecting said one inner part to said one outer part, said one inner part having a freedom of radial movement resulting from said radial clearance; said method comprising the following steps: unbalancing at least one element belonging to said inner part, the imbalance created being greater than the balance which results, upon rotation of said device, from clearance existing in said one joint or said one sliding connection, then balancing the whole of said transmission device by acting, in a known manner, on at least one element belonging to said one outer part which is centered relative to said structural support.

3. Method according to claim 1, wherein said imbalance is achieved by rendering at least one part of said element belonging to said one inner part eccentric.

4. Method according to claim 1, wherein said imbalance is achieved by adding a weight in an eccentric region of said element belonging to said one inner part.

5. Method according to claim 1, comprising creating said imbalance on an element close to said one joint or said one sliding connection having a radial clearance.

6. Method according to claim 1, wherein, if m represents the mass of said eccentric part, e represents the distance of eccentricity from the axis of rotation of said unbalanced element, M represents the mass of said one inner part to which said unbalanced element belongs, and j the radial clearance inherent in said one joint or said one sliding connection, the following relation: m×e>M×j is respected.

7. Method according to claim 2, wherein said imbalance is achieved by rendering at least one part of said element belonging to said one inner part eccentric.

8. Method according to claim 2, wherein said imbalance is achieved by adding a weight in an eccentric region of said element belonging to said one inner part.

9. Method according to claim 2, comprising creating said imbalance on an element close to said one joint or said one sliding connection having a radial clearance.

10. Method according to claim 2, wherein, if m represents the mass of said eccentric part, e represents the distance of eccentricity from the axis of rotation of said unbalanced element, M represents the mass of said one inner part to which said unbalanced element belongs, and j the radial clearance inherent in said one joint or said one sliding connection, the following relation: m×e>M×j is respected.

11. Rotary transmission device, comprising at least one outer part which is for centering, in used relative to a structural support and has a well-defined axis, at least one inner part, and at least one joint or at least one sliding connection having a radial clearance, connecting said one inner part to said one outer part, said one inner part having a freedom of radial movement resulting from said radial clearance, at least the element belonging to said one inner part having an imbalance which is greater than the imbalance which results upon rotation of said device, from clearance existing in said one joint or said one connection.

12. Rotary transmission device, comprising at least one outer part which is for centering, in use, relative to a structural support and has a well-defined axis, at least one inner part, and at least one joint or at least one sliding connection having a radial clearance, connecting said one inner part to said one outer part, said one inner part having a freedom of radial movement resulting from said radial clearance; at least one element belonging to said outer part which is centered relative to said structural support being modified so as to balance the whole of said transmission device.

* * * * *

UNITED STATES PATENT AND TRADEMARK OFFICE
CERTIFICATE OF CORRECTION

PATENT NO. : 5,457,992
DATED : October 17, 1995
INVENTOR(S) : Pierre Guimbretiere It is certified that error appears in the above-indentified patent and that said Letters Patent is hereby corrected as shown below:

Column 2, line 9, "One" should be --one--

Column 4, line 1, "E" should be --r--

Column 6, line 5, Claim 11, "used" should be --use--

Signed and Sealed this

Twelfth Day of March, 1996

Attest:

BRUCE LEHMAN

Attesting Officer          Commissioner of Patents and Trademarks